[11] 4,388,375
[45] Jun. 14, 1983

[54] POLYESTER BASED POLARIZER

[75] Inventors: Michael J. Hopper, Taylors; Michael R. Martin, Greenville, both of S.C.; Lawrence Bolt, Van Nuys; Michael Smith, Thousand Oaks, both of Calif.; Ali Tavasolian, North Hollywood, Calif.

[73] Assignee: American Hoechst Corporation, Somerville, N.J.

[21] Appl. No.: 324,507

[22] Filed: Nov. 24, 1981

[51] Int. Cl.$^3$ .................. B32B 27/40; G02F 1/13
[52] U.S. Cl. .................. 428/423.7; 156/229; 156/244.24; 156/272.2; 156/280; 350/337; 350/397; 428/483; 428/520; 428/522
[58] Field of Search ............ 428/515, 520, 483, 423.7, 428/522; 264/1.3, 1.4, 40.1; 156/229, 244.24, 272.2, 280; 350/337, 397

[56] References Cited

U.S. PATENT DOCUMENTS

| 2,237,567 | 4/1941 | Land |
|---|---|---|
| 2,854,697 | 12/1954 | Ryan |
| 2,896,262 | 4/1954 | Herrmann |
| 2,996,956 | 8/1961 | Ryan et al. |
| 3,058,393 | 3/1958 | Ryan et al. |
| 3,058,862 | 10/1962 | Miyahara et al. ............ 428/515 |
| 3,254,561 | 6/1966 | Makas ............ 264/1.3 |
| 3,265,777 | 7/1963 | Marks |
| 3,370,111 | 9/1964 | Boone |
| 3,459,839 | 10/1964 | Hutfles |
| 3,621,085 | 3/1969 | Ichikawa |
| 3,627,579 | 11/1969 | Heffelfinger |
| 4,025,688 | 5/1977 | Nagy et al. ............ 428/457 |
| 4,072,779 | 2/1978 | Knox et al. ............ 428/483 |
| 4,112,178 | 9/1978 | Brown |
| 4,190,418 | 2/1980 | Buzzell |
| 4,228,574 | 10/1980 | Culley et al. |
| 4,230,768 | 10/1980 | Hamada et al. ............ 350/397 |
| 4,268,127 | 5/1981 | Oshima et al. ............ 350/337 |

FOREIGN PATENT DOCUMENTS

1134876  2/1967  United Kingdom.

*Primary Examiner*—Jerome W. Massie
*Attorney, Agent, or Firm*—Richard S. Roberts

[57] ABSTRACT

A polarizer having increased hydrolytic stability is produced by impregnating a polyvinyl alcohol substrate with an iodine containing composition and then subjecting the substrate to both concentrated infrared and ultraviolet radiation treatments sufficient to substantially increase the hydrolytic stability of the thusly formed polarizer. The polyvinyl alcohol film had been laminated to a polyester support with a dispersed, aqueous composition of polyvinyl alcohol or polyurethane on its surface.

16 Claims, No Drawings

POLYESTER BASED POLARIZER

BACKGROUND OF THE INVENTION

The present invention relates to light polarizers or more particularly to light polarizers having increased hydrolytic stability.

U.S. Pat. No. 4,025,688 teaches the manufacture of light polarizers by providing a film of polyvinyl alcohol with a dichroic stain such as iodine. The polarizer may optionally be supported by a layer of cellulose acetate butyrate bonded to the polarizer through a hydrophilic tie coat.

A problem with this type of polarizer is it demonstrates poor hydrolytic stability. That is, its polarizing efficiency, or ability to polarize light, decreases over time as heat and humidity increases. This tendency is disadvantageous for such uses as in liquid crystal displays especially for automobile instruments which must function in a wide range of heat and humidity conditions.

Czechoslovakian Pat. No. 122,408 discloses a process for stabilizing polarizing film by exposure to radiation at a wavelength of less than 400 nm for three hours.

Russian Pat. No. 124,116 stretches a polyvinyl alcohol film, heats it and then places the film into an iodized solution containing hydrobromic acid and hydriodic acid with subsequent washing and drying. There is no subsequent heating.

It has also been a problem in the art to produce a clear, thermoplastic film which is tough, chemically resistant and which is useful for optically critical purposes such as the production of polarizers. Biaxially oriented polyester film, while it is clear and tough, has an optic axis plane angle which varies from point to point across the web. This variation of orientation of the optic axis plane precludes the use of biaxially oriented polyester film for most such optically critical applications.

In the production of polarizing sheets, a film of a substrate is laminated to a film of polyvinyl alcohol. This laminate is then passed through an aqueous staining bath containing iodine and one or more iodine salts to tint the polyvinyl alcohol film. Stabilizing treatments may then be employed.

The present invention provides an improved hydrolytically stabilized polarizer with a tough, optically critical polyester substrate. Such improved substrate possesses a very low extinction angle, thus making it highly useful for polarizing applications, and at the same time demonstrates increased adhesion to the polyvinyl alcohol film to which it is laminated. It also demonstrates improved thermal dimensional stability, an improved moisture barrier and reduced water and solvent content.

SUMMARY OF THE INVENTION

The present invention is directed to a polarizer prepared by the process which comprises:

(a) extruding a moving molten web of polyester film; and (b) quenching the moving web to solidify it in a substantially amorphous form; and (c) applying a coating of a dispersed aqueous composition of polyvinyl alcohol or polyurethane to at least a portion of the surface of said film; and (d) stretching the moving web in a direction transverse to the direction of motion while heating the web at a temperature of from about its glass transition temperature to about 160° C.; and (e) crystalizing the transversely restrained moving web by heating it to a temperature in the range of 130° C. to 240° C. without stretching said web; and (f) cooling said web to substantially ambient atmospheric room temperature; and (g) adhering a polyvinyl alcohol film to at least a portion of said polyester film coating; and (h) staining said polyvinyl alcohol film in a bath of an iodine containing composition; and (i) subjecting said polyvinyl alcohol film to concentrated sources of infrared and ultraviolet radiation sufficient to substantially increase the hydrolytic stability of the formed polarizer.

DETAILED DESCRIPTION OF THE INVENTION AND DRAWINGS

The present invention provides an improved polarizing element having a clear, flexible, uniaxially oriented polyester film as a base substrate. The substrate exhibits the quality physical characteristics of conventional polyester films and exhibits the optically desirable quality of having a 0° to 6° extinction angle. A special coating on the polyester provides improved adhesion to polyvinyl alcohol films.

A polarizing element is typically made from two to three mil cast polyvinyl alcohol (PVA) film. This film is linearly stretched 300 to 500% by means of pull rolls and a heat source such as an oven, hot air knife or hot bar. In its stretched form the PVA film is joined for example via lamination to a substrate such as the improved uniaxially drawn and coated polyethylene terephthalate which will be described hereinafter.

This laminate is then run through an iodine bath where the iodine quickly diffuses into the PVA film and affixes to the thin, parallel molecules formed in the stretching operation. Excess iodine is washed away and the stained film is passed through a boronic stabilizing solution typically comprising boric acid, which imparts chemical and moisture resistance to the stained surface by cross-linking the PVA. Excess stabilizing solution is washed off and the film is dried and coiled or sheeted.

While dry heat does not appreciably affect such polarizers, a combination of high heat and high humidity appreciably deteriorates the polarizing efficiency of the polarizer over time.

It has been found that hydrolytic stability can be increased up to about 20 times by subjecting the formed polarizer to both infrared and an ultraviolet radiation treatment.

In the preferred embodiment, a two to three mil cast polyvinyl alcohol film is uniaxially stretched while being heated so that the film is about 3 to 5 times its original length. The polyvinyl alcohol film is then adhered to a clear uniaxially transversely drawn polyethylene terephthalate substrate, preferably via lamination, by passing the substrate and the PVA film through the nip of a set of roller while applying an adhesive, such as water, polyvinyl alcohol or polyurethane between the film and the substrate.

The flexible polyester film of the present invention may be any flexible film formed from any thermoplastic film forming polyester which is produced by condensing a dicarboxylic acid or a lower alkyl diester thereof with a glycol. Among the dicarboxylic acids and their lower alkyl diesters which may be employed to form a flexible polyester film support are terephthalic; isophthalic; phthalic; 2,5- 2,6-, and 2,7-naphthalene dicarboxylic; succinic; sebacic; adipic; azelaic; bibenzoic; the hexahydrophthalics, and bis-p-carboxy-phenoxyethane. One or more of these acids and/or their lower alkyl diesters is reacted with one or more glycols which include ethylene glycol; diethylene glycol; 1,3-propanediol; 1,4-butanediol; neopentyl glycol or 1,4-cyclohexanedimethanol. Since one or more diesters may be reacted with one or more glycols, the polyester film of this invention is not limited to homopolyesters, but also includes mixed polyesters such as copolyesters.

Of the film forming polyesters within the contemplation of this invention, preferred are those containing at least a major amount of polyethylene terephthalate, the most preferred being polyethylene terephthalate. Polyethylene terephthalate film is formed from a polymer produced by polymerization of bis-(2-hydroxyethyl) terephthalate. Bis-(2-hydroxyethyl) terephthalate is itself formed as in intermediate by one of two different methods. One method for producing bis-(2-hydroxyethyl) terephthalate is by direct esterification of terephthalic acid with ethylene glycol as described in U.S. Pat. No. 3,050,533. In this method, the by-product of the reaction is water which is distilled from the reaction product. A second method for producing bis-(2-hydroxyethyl) terephthalate is by transesterification of a dialkyl ester of terephthalic acid, preferably dimethyl terephthalate, with ethylene glycol. Preferably, two molecular proportions of ethylene glycol react with one molecular proportion of the dialkyl terephthalate. More preferably, more than two molecular proportions of ethylene glycol per molecular proportion of the dialkyl terephthalate are used since under these conditions the initial transesterification reaction occurs more rapidly and completely. The transesterification reaction is conducted under conditions of elevated temperature. For example, a temperature in the range of between about the boiling temperature of the reaction mixture to as high as 250° may be used. The reaction can occur at atmospheric, sub-atmospheric or super-atmospheric pressure. The by-product of the transesterification reaction is an alkanol. For example, if dimethyl terephthalate is used, methanol is produced. The alkanol is removed from the reaction product. In order to increase the reaction rate, many known catalysts may be employed in the transesterification reaction, as desired.

After the bis-(2-hydroxyethyl) terephthalate has been produced, it may be converted to polyethylene terephthalate by heating at a temperature above the boiling point of the ethylene glycol or the reaction mixture under conditions affecting the removal of the glycol or water. The heating may occur at a temperature as high as 325° C., if desired. During heating, pressure is reduced so as to provide rapid distillation of the excess glycol or water. The final polyethylene terephthalate polymer may have an intrinsic viscosity, as measured in orthochlorophenol at 25° C. in excess of 0.3 deciliter per gram. More preferably, the intrinsic viscosity of the polymer ranges from about 0.4 to about 1.0 deciliter per gram, again measured in orthochlorophenol at 25° C. Still more preferably, the polyethylene terephthalate employed in the present invention has an intrinsic viscosity of about 0.5 to about 0.7 deciliter per gram as measured in orthochlorophenol at 25° C.

It has been a problem in the art to produce a clear, thermplastic film substrate which is tough, chemically resistant and which is useful for optically critical purposes such as polarizer carrier sheet or cover for a liquid crystal display. Biaxially oriented polyester film, while it is clear and tough, has an optic axis plane angle which varies from point to point across the web. This variation of orientation of the optic axis plane precludes the use of biaxially oriented polyester film for most optically critical applications.

The optic axis planar orientation problem is substantially overcome by producing a polyester film by the process of:

(a) extruding a moving molten web of polyester film; and (b) quenching the moving web to solidify it in a substantially amorphous form; and (c) applying a coating of a dispersed aqueous composition of polyvinyl alcohol or polyurethane to at least a portion of the surface of said film; and (d) stretching the moving web in a direction transverse to the direction of motion while heating the web at a temperature of from about its glass transition temperature to about 160° C.; and (e) crystalizing the moving web by heating it to a temperature in the range of 130° C. to 240° C. under tension but without stretching said web; and (f) cooling said web to substantially ambient atmospheric temperature.

In a preferred embodiment, the polyester film forming polymer is melted and thereafter extruded onto a polished revolving casting drum to form a cast, flexible sheet of the polymer. Then the polyester film is applied with a substantially clear coating comprising a dispersed aqueous composition of polyvinyl alcohol or polyurethane. Thereafter, the film is transversely uniaxially stretched in a tenter frame while being heated to a temperature in the range of 80° C. to 160° C., preferably in the range of 90° C. to 100° C. The stretched film is stretched about 2 to 6 times its original dimension and preferably 2.5 to 4.5 times, most preferably 4 times. It is important that the stretching temperature is above the glass transition temperature of the film. The film is then crystalized by heating to a temperature of from about 130° C. to about 240° C., preferably 150° to 180° C., while being transversely restrained but without film stretching. Crystalizing is normally complete when this treatment is performed for about five seconds or more. The film is then cooled to substantially ambient atmospheric room temperature. The thusly produced film may have a thickness of from 0.48 to 30 mils, preferably 1 to 9 mils, most preferably 3 to 7 mils.

The important feature of the produced film substrate is that is has a very low extinction angle. Extinction is the condition exhibited by a crystal when its optic axial plane is aligned with one of a pair of crossed polaroids. The extinction angle is the angle through which a crystal is revolved from a definite line (as that of the crystallographic axis) to the plane of maximum extinction. For a birefringent film, the extinction angle is the inclination of the optic axial plane to the transverse stretch direction. The extinction angle of the present film is to be as close to zero as possible. The angle may range from 0° to 6°, preferably 0° to 3° and most preferably 0°.

The process of producing this polyester film is more fully described in U.S. patent application, Ser. No. 262,669, filed May 11, 1981, now abandoned, which is incorporated herein by reference.

In the preferred embodiment, the dispersed polyvinyl alcohol composition is an aqueous solution of polyvinyl alcohol containing from about 2% to about 2% solids by weight, preferably 5% to 20%, most preferably 5% to 10%, although the skilled artisan may use more or less for this purpose. The preferred polyvinyl alcohol is hydrolyzed from about 33% to about 99%. The coating composition is preferably gravure rolled or slot coated onto the polyester substrate at a coating weight of from about 0.07 to about 1.0 dry pounds of coating per thousand square feet of film before stretching, although the skilled artisan may use more or less for his purposes. The most preferred polyvinyl alcohol is Vinol 205 which is an 89% hydrolyzed product of Air Products, Inc. of Greenville, S.C. Other useful polyvinyl alcohols include Mowiol 4-88; 8-88; 4-98; 66-100 and 13-72 available from Hoechst AG of Frankfurt, West Germany.

Useful polyurethanes include Neo-rez R-940, R-960 and R-963 aqueous polyurethane dispersions. The preferred polyurethane composition useful for the present invention is a water dispersion of Neo-rez R-943 polyurethane, all available from Polyvinyl Chemical Co. The preferred dispersion comprises from about 15% to about 40% solids by weight, preferably from about 15% to 30% and most preferably from about 15% to about 20%, although the skilled artisan may use more or less for his purposes. It is preferably applied at a coating weight of from about 0.07 to about 0.35 dry pounds of coating per thousand square feet of film before stretching, although the skilled artisan may use more or less for his purposes.

An important criterion in judging compositions useful in the context of the present invention includes a high degree of clarity when the polyester is coated, stretched and crystalized. Also, the coating should not be so soft as to cause the film to block when being rolled. Furthermore, it should be able to bond the polyester to a film of polyvinyl alcohol so well that when a laminate of the coated polyester film and a sheet of polyvinyl alcohol is passed through a staining process to produce a polarizer and tested by subjecting it to an environment of 70° C. at 95% relative humidity for 300 hours, the polyvinyl alcohol film should shrink only an insubstantial amount, for example about 3% or less preferably less than 1.5% away from the polyester substrate.

As a next step in the production of the polarizer, the coated, uniaxially drawn polyethylene terephthalate substrate is joined, preferably by lamination to the stretched polyvinyl alcohol film. In the preferred embodiment, a bonding agent is applied between the coated surface of the polyester and the polyvinyl alcohol film. Preferred bonding agents include water, an aqueous polyvinyl alcohol solution and an aqueous polyurethane dispersion, and mixtures thereof. Typical bonding agents include those comprising the compositions employed in the coating for the polyester film.

It has been found most advantageous to use a water bonding agent if the polyester coating employed is polyvinyl alcohol. If the polyester coating is polyurethane, then an especially advantageous bonding agent comprises a dispersed aqueous composition containing polyurethane and polyvinyl alcohol. A most preferred polyurethane for this purpose is Neo-rez 943. A most preferred polyvinyl alcohol for this purpose is Vinol 205. Other polyurethane and polyvinyl alcohol types, especially those heretofore described may be employed by the skilled artisan. The polyvinyl alcohol may be present in the bonding composition in an amount of from about 2% to about 25% by weight, preferably about 2% to about 20%, most preferably about 2% to about 10%.

The polyurethane may preferably be present in an amount of from about 5% to about 40% by weight, preferably from about 5% to about 30%, most preferably 5% to about 10%. When both the polyurethane and polyvinyl alcohol are present, their preferred ratio is about 4:1 polyurethane to polyvinyl alcohol dispersed in water.

The polyvinyl alcohol film portion of the laminate is then stained by running it through an iodine bath, which also contains an iodide salt such as potassium iodide, and then through a stabilizing boronic treatment such as an aqueous solution of borax and boric acid as is well known in the art.

The treated film is then subjected to both a concentrated infrared heat treatment and a concentrated ultraviolet light treatment to substantially increase its hydrolytic stability over time. Typically, the thusly formed polarizer is passed over two 800 watt infrared heaters and passed once or twice under a 300 watt per lineal inch focused mercury vapor lamp to produce a polarizer.

In the preferred embodiment, the staining bath is aqueous and contains sufficient iodine to impart the desired stain to the polyvinyl alcohol film. Typically this amount ranges from about 0.1% to 2% by weight of the solution. The bath also contains an iodide salt, such as potassium, sodium, lithium or hydrogen iodide which promotes the acceptance of the colored iodine stain into the polyvinyl alcohol. The iodide salt may be present in an amount of from about 1% to about the saturation point of the solution. A more preferred range is from about 10% to about 25%. The optimum quantity can be determined by the skilled artisan. One preferred quantity is about 21% potassium iodide. Preferably the solution may be maintained at a temperature of from about 95° F. to about 105° F. One may optionally include other ingredients in the staining bath, such as alcohols, to promote staining.

The stained films may next be introduced into a boronic stabilizing bath such as is well known in the art. A typical stabilizing bath contains an aqueous solution of 5% borax and 15% boric acid. A typical dwell time is about 90 seconds. The film may then be dried by air or in an oven. The thusly prepared film is hydrolytically stabilized by being subjected to exposure to both sources of infrared and ultraviolet radiation.

A typical infrared treatment consists of passing the film at a line speed of about 5 feet per minute under two 800 watt heaters spaced 5 inches apart. Each is parabolically reflected at a 2 ¾ inch focal length to produce an exposure line approximately one inch wide. Exposure is completed in less than one minute, or more typically from about 5 to 15 seconds. Obviously the exact parameters may be determined by the skilled artisan for his most advantageous use.

A typical ultraviolet treatment consists of passing the film at a line speed of about 5 feet per minute under a parabolically reflected high pressure mercury vapor lamp having discrete emission in the UV range. Such an arrangement may have a 5 inch focal length and generate a ¾ inch exposure line across the entire width of a polarizer web at an output of 300 watts per lineal inch of web width. Again exposure is completed in less than one minute or more, typically from about 5 to 15 seconds. The exact parameters may also be determined by the skilled artisan for his most advantageous use.

The following non-limiting example is illustrative of the operation of the invention.

EXAMPLE

Molten polyethylene terephthalate is extruded onto a cold casting drum to form an amorphous cast film. The thusly formed film is then coated with a 10% aqueous solution of Viniol 205 polyvinyl alcohol by gravure coating to a coating weight of 0.10 dry pounds of coating per thousand square feet of film. The film is then heated, while being stretched transversely to the direction of its motion, at a temperature in the heating zone of from 97° to 105° C. The film is thusly stretched four times its original width. The stretched film is then heated to a temperature in a heating zone of from 208° to 214° C. while transversely restrained to crystalize the film. The crystalized film is then cooled to 29° C.

A sheet of two mil polyvinyl alcohol is cast into a film and linearly stretched 500%. The two films are pressed together through the nip of a pair of rollers while a water adhesive is applied between the films. This laminate is then dipped through a staining bath containing an aqueous solution of 21% potassium iodide and a 0.4% iodide. The stained laminate is then introduced into an aqueous stabilizing bath containing 5% borax and 15% boric acid for a 90% second dwell time with subsequent drying. The thusly produced film is then passed, at a line speed of 5 feet per minute under two parabolically reflected 600 watt infrared heaters spaced 5 inches apart. The focal length is 2 ¾ inches and produces an exposure line one inch wide. The film is then passed under a parabolically reflected high pressure mercury vapor lamp having an output of 300 watts per lined inch of web with a ¾ inch exposure line. The result is a polarized sheet having a relatively high degree of hydrolytic stability as compared to a non-irradiated polarized sheet.

Although very specific embodiment of the invention have been disclosed herein, it is to be understood that further modifications may hereby be suggested to those skilled in the art, and the invention is not limited to such embodiments.

What is claimed is:

1. A polarizer prepared by the process which comprises:
   (a) extruding a moving molten web of polyester film; and
   (b) quenching the moving web to solidify it in a substantially amorphous form; and
   (c) applying a coating of a dispersed aqueous composition of polyvinyl alcohol or polyurethane to at least a portion of the surface of said film; and
   (d) stretching the moving web in a direction transverse to the direction of motion while heating the web at a temperature of from about its glass transition temperature to about 160° C.; and
   (e) crystalizing the transversely restrained moving web by heating it to a temperature in the range of 130° C. to 240° C. without stretching said web; and
   (f) cooling said web to substantially ambient atmospheric room temperature; and
   (g) adhering a polyvinyl alcohol film to at least a portion of said coating; and
   (h) staining said polyvinyl alcohol film in a bath of an iodine containing composition; and
   (i) subjecting said polyvinyl alcohol film to concentrated sources of infrared and ultraviolet radiation sufficient to substantially increase the hydrolytic stability of the formed polarizer.

2. The polarizer of claim 1 wherein said polyester film comprises polyethylene terephthalate.

3. The polarizer of claim 1 wherein the temperature in step (d) ranges from about 80° C. to about 110° C.

4. The polarizer of claim 1 wherein said polyvinyl alcohol film is laminated to said support sheet.

5. The polarizer of claim 1 wherein an adhesion promoting agent is disposed between said polyvinyl alcohol film and said coating on said polyester film.

6. The polarizer of claim 5 wherein said adhesion promoting agent comprises one or more compounds selected from the group consisting of water, polyvinyl alcohol and polyurethane.

7. The polarizer of claim 1 wherein said iodine containing bath comprises water, iodine and one or more compounds selected from the group consisting of potassium, sodium, lithium and hydrogen iodide.

8. The polarizer of claim 1 further comprising the step of subjecting said stained film to a stabilizing treatment of a boronic composition prior to said radiation steps.

9. The polarizer of claim 8 wherein said boronic composition comprises an aqueous solution of one or more compounds selected from the group consisting of boric acid and borax.

10. The polarizer of claim 1 wherein said iodine is present in an amount of from about 0.1% to about 2% by weight of said bath.

11. The polarizer of claim 7 wherein said iodide is present in said bath in an amount by weight of from about 1% to about the saturation point.

12. The polarizer of claim 1 wherein said dispersd aqueous composition comprises an aqueous solution of polyvinyl alcohol wherein said polyvinyl alcohol is present in an amount of from about 2% to about 25% by weight.

13. The polarizer of claim 1 wherein said dispersed aqueous composition comprises an aqueous dispersion of polyurethane wherein said polyurethane is present in an amount of from about 5% to about 40% by weight.

14. The polarizer of claim 12 wherein said polyvinyl alcohol in said dispersed aqueous composition is hydrolyzed from about 33% to about 99%.

15. The polarizer of claim 12 wherein said coating weight ranges from about 0.07 to about 1.0 dry pounds of coating per thousand square feet of unstretched film.

16. The polarizer of claim 13 wherein said coating weight ranges from about 0.07 to about 0.35 dry pounds of coating per thousand square feet of unstretched film.

* * * * *